United States Patent [19]

Hochmuth et al.

[11] 3,987,524
[45] Oct. 26, 1976

[54] CUTTING TOOL

[75] Inventors: Walter Hochmuth, Nurnberg; Hans Peter Hollfelder, Fuerth, both of Germany

[73] Assignee: Firma Robert Zapp, Werkzeug-und Maschinenfabrik GmbH, Stuttgart, Germany

[22] Filed: Mar. 1, 1976

[21] Appl. No.: 662,981

[30] Foreign Application Priority Data
Mar. 4, 1975 Germany............................ 2509226
Dec. 6, 1975 Germany............................ 2555035

[52] U.S. Cl. .................................... 29/96; 29/95 R
[51] Int. Cl.² ............................................ B26D 1/00
[58] Field of Search ............................... 29/95, 96

[56] References Cited
UNITED STATES PATENTS
3,577,618  5/1971  Cashman ......................... 29/96
3,653,107  4/1972  Hertel ............................. 29/96
3,754,309  8/1973  Jones et al. ..................... 29/96

FOREIGN PATENTS OR APPLICATIONS
1,060,906  3/1967  United Kingdom ............. 29/96

*Primary Examiner*—Leonidas Vlachos
*Attorney, Agent, or Firm*—Frank J. Jordan

[57] ABSTRACT

A cutting tool includes a tool holder and a cutting bit secured to the tool holder by a clamping jaw. The tool holder has a recess defining a seating surface against which the clamping jaw bears to secure the cutting bit to the tool holder. The cutting bit has cutting means on both longitudinal end portions, and the position of the cutting tool on the tool holder may be changed so that either cutting means may be used. The recess in the cutting bit is constructed and arranged such that the cutting bit may be mounted in two different positions on the tool holder utilizing the same recess for accommodating the clamping jaw.

20 Claims, 15 Drawing Figures

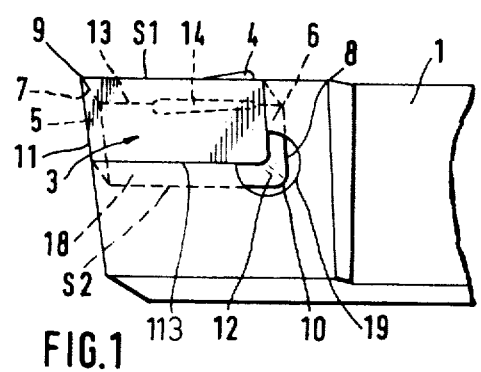
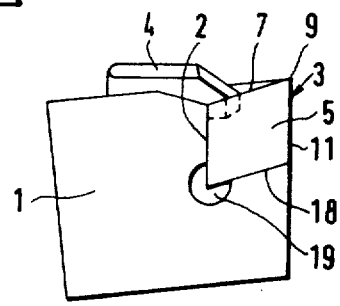
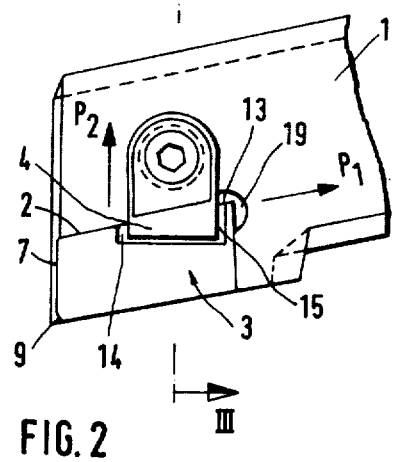
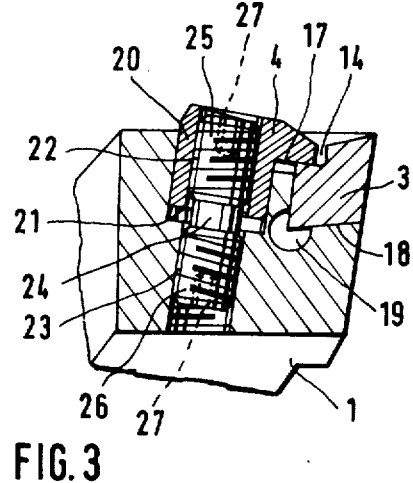
FIG. 1
FIG. 4
FIG. 2
FIG. 3

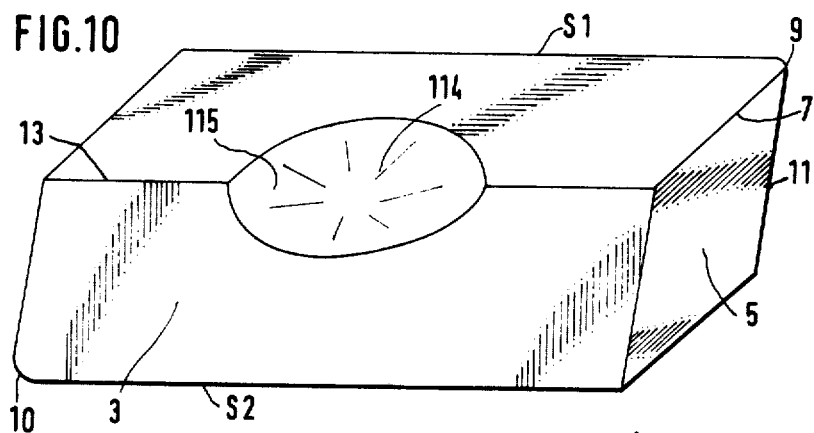
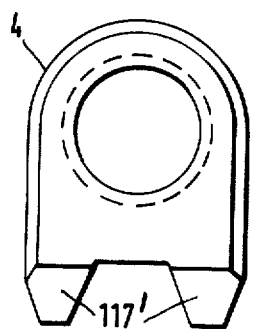
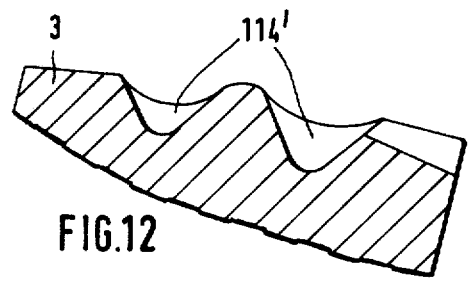
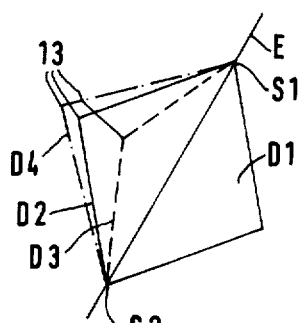
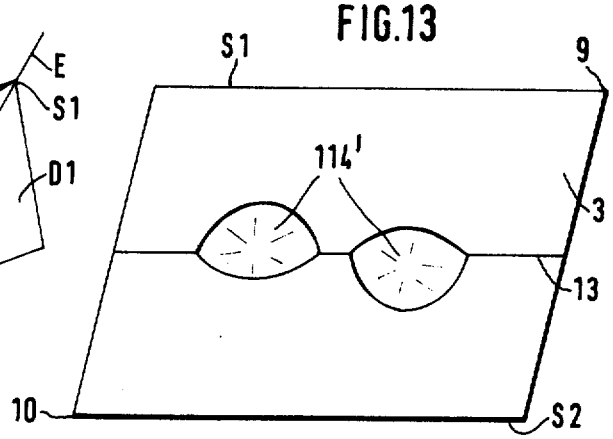

CUTTING TOOL

BACKGROUND OF THE INVENTION

This invention relates to a cutting tool for the machining of metals in conjunction with the removal of chips and to an arrangement of a tool holder and a cutting bit, the latter being capable of being mounted in a recess in the tool holder and being fastened therein by a clamping jaw, the cutting bit being provided with two cutting edges and with cutting points with the latter being disposed at the end points of a diagonal line.

Complicated shaping of a cutting tool was heretofore required to meet the need of providing for each cutting edge a different recess for the creation of tilted seating planes or surfaces for effecting clamping in such a way that the clamping jaw pulls the cutting bit rearwardly into the seat while being tightened. To avoid such complicated shaping, a cutting tool of the aforesaid kind, according to the present invention, is arranged such that the tilted edges of the frontal planes are formed as auxiliary cutting edges; the cutting bit has a kiteshaped, or preferably a rhombic or a square cross section where the oppositely disposed longitudinal edges serve as the main cutting edges of the cutting tool; a recess is provided in the cutting bit within the area of at least one of the other longitudinal edges, preferably the longitudinal edge which connects the auxiliary cutting edges, the recess being shaped essentially conical or frustro-conical, or forming a seating surface for the clamping jaws in both working positions of the cutting tool, the seating surface being tilted in relation to the seat of the tool holder and also being tilted inwardly upwards. Kiteshaped as used herein means a quadrangle which is formed by two isosceles triangles which are combined at their common bases. When all legs are equal a rhombus occurs, or as a special shape a square.

According to the present invention the provision of the cutting bit with a kite-shaped, or particularly with a rhombic or square cross section, allows an arrangement in such a way that the edges which form the radii of the points are each time disposed diagonally opposite to the other auxiliary cutting edge, so that contrary to the well known two-edge tools, where usually also the auxiliary cutting edges on one hand and the edges of the point radii on the other hand are parallel to each other, two contact planes do not have to be disposed upon the clamping jaw, but the contact planes may abut within the area of an edge and thus may be shaped by a single recess. This leads to a shape of a cutting bit that is made out of a small basic blank, a practice which allows great savings in raw material, particularly in hard alloy, and also allows a simpler method of manufacture and an exact method of clamping.

In a further development of the present invention it may be provided that the direction of the chuck of the clamping jaw and/or its clamping plane which presses unto the cutting tool are tilted against the seat of the tool shaft, at an angle greater than the self-locking action, so that essentially a gripping action results, the gripping action being directed rearwardly into the seat of the cutting tool and essentially in the direction of the diagonal line which connects both cutting points.

This effect may be obtained in a particularly simple manner by shaping the recess as a keyway which traverses the respective longitudinal edge obliquely whereby the recess should preferably end at both sides before reaching the frontal planes in order to secure better mounting and guiding of the cutting bit within the recess of the holder. This improvement includes providing a correspondingly larger abutting plane between the inner seat of the cutting bit, the seat opening each time into the free plane, and the abutting side plane of the recess of the tool holder.

If the recess is essentially conically or frustro-conically shaped, it is possible to develop the present invention by providing two recesses at a distance from each other for two separated fingers of the clamping jaw, such recesses being disposed along a line running obliquely to the longitudinal edge of the cutting bit.

In a further extension of the present invention it may be provided that the frontal planes of the cutting tool are tilted obliquely in relation to the longitudinal side planes in such a way that each time the three edges which form a cutting point form acute angles with each other. This results in a positive cutting bit with a free plane without the provision of a step for guiding the chips which, of course, may be also additionally provided. As a particular advantage the frontal planes should be oriented in such a way that the edge of the cutting tool which embraces the recess forms a right angle with the frontal plane diagonals which extend from its ends. This special choice of the free angle allows a particularly simple fabrication of the cutting bit according to the present invention, because the recess may be formed while the bit is sintered from a hard alloy.

In order to prevent misunderstandings it should be mentioned here that it does not contradict the aim of the present invention when, where according to the present invention, recesses are provided in each of the longitudinal edges of the cutting tool which do not form the main cutting edges of the cutting tool. The contradiction seems to lie in the desire not to provide separate recesses for the clamping jaw for using each of the cutting edges, in other words to clamp the cutting tool in such a way that each time one or the other cutting edge is in an active position. According to the present invention the clamping jaw engages each time the identical recess when the cutting edges are changed. The simultaneous provision of a second recess in the oppositely disposed longitudinal edge has no active function when the cutting tool is used or is clamped. This provision however permits the use of a common blank for the preparation of right or left cutting bits, whereby of course this possibility is restricted to a symmetrical formation of cross sections, in other words a rhombic or square cross section of the cutting tool.

The clamping hold between the cutting bit and the tool holder by aid of a clamping jaw may for example, be provided in such a way that a tapped hole is provided within the tool holder for a setscrew engaging the thread in a bearing leg, the setscrew serving to secure the clamping jaw, a tapped hole being tilted in relation to the accepting borehole in the bearing leg of the clamping jaw. It may be particularly advantageous to provide a spring element between the bearing leg and the bottom of the accepting borehole, the borehole being without an opening at the other end and the spring element being made from rubber. The spring element is compressed when the cutting tool is clamped so that when the clamping is relieved by the relieving of the spring element, the clamping jaw is automatically lifted outwardly, a fact which facilitates removing of the cutting tool, for example, for the changing of working positions.

Finally it is also within the scope of the present invention to build the mounting for the clamping jaw in such a manner that the bearing leg of the clamping jaw has an axially transverse threaded tap which mates with a thread bolt, the bolt being activated when the tool is being activated. The thread bolt is provided at its other end with a thread in an opposite direction for screwing into a tapped hole which follows the accepting borehole for the bearing leg in the tool holder, in which case a hexagonal recess may be provided on both sides of the threaded bolt for a hex-key for the activation of the tool.

This provision prevents the application of two taps which are inclined to each other, one as a bearing recess for the bearing legs of the clamping jaw and one for the setscrew which activates the clamping jaw, a construction which is difficult to provide and which might also detract from the strength of the tool.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A cutting tool includes a tool holder having a recess, a cutting bit in the recess, and a clamping jaw securing the cutting bit to the tool holder. The cutting bit has four longitudinal sides joining one another to form longitudinal edges with oppositely disposed longitudinal edges defining the main cutting edges of the tool bit. The cutting bit also has frontal faces at the longitudinal ends thereof, such frontal faces terminating in edges defining auxiliary cutting edges. Each longitudinal main cutting edge intersects a transverse auxiliary cutting edge to provide cutting means at diagonally opposite longitudinal ends of the cutting bit, with each cutting means and associated cutting edges being operable to selectively effect a cutting action depending on the orientation of the mounting of the cutting bit on the tool holder. The cutting bit has means thereon defining a recess extending from at least one of the longitudinal edges, the recess having a seating surface against which the clamping jaw is clamped. The cutting bit may be mounted in two different positions on the tool holder utilizing the same recess for accommodating the clamping jaw.

BRIEF DESCRIPTION OF THE DRAWINGS

FIG. 1 is a partial side view of the head of a cutting tool, looking slightly obliquely from below, according to one embodiment of the invention.

FIG. 2 is a top view of the arrangement shown in FIG. 1.

FIG. 3 is a cross sectional view taken along the line III—III in FIG. 2.

FIG. 4 is a front view of the cutting tool.

FIG. 10 is a perspective view, on a larger scale, of the cutting bit used in FIG. 9.

FIGS. 12 and 13 are partial sectional and oblique views respectively of a variation of a cutting bit having two recesses spaced at a distance from each other and used with a clamping jaw having two fingers.

FIG. 14 is a top view of the respective clamping jaw having two clamping fingers.

FIG. 15 is an enlarged frontal view of a cutting bit alone(corresponding to the view in FIG. 4) where further possibilities of variation of the cutting bit cross sections are suggested.

DESCRIPTION OF THE PREFERRED EMBODIMENTS

Figure 5:
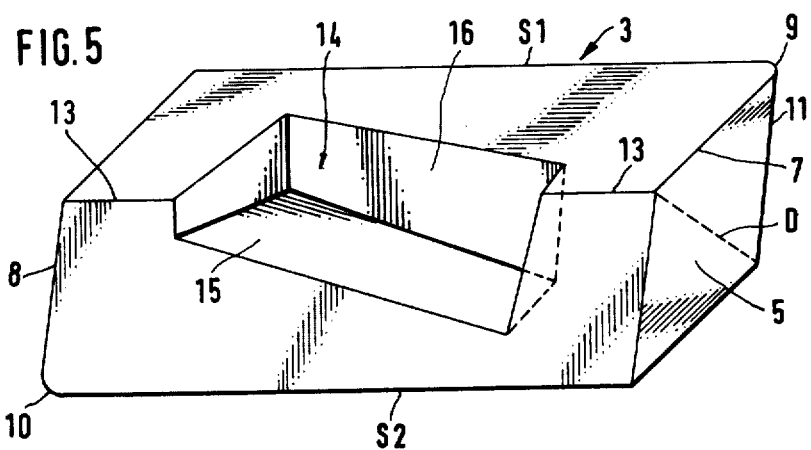
FIG. 5 is an enlarged perspective view of the cutting bit being used in the embodiment of FIGS. 1 to 4.

The cutting tool according to the embodiment of the present invention in FIGS. 1 to 5 consists of a tool holder 1 having a recess 2 for the acceptance of a cutting bit 3 which is held in the recess 2 by a clamping jaw 4. The cutting bit 3 is made from a parallelepiped blank having a rhombic cross section and is furnished with main cutting edges S1 and S2, which are diagonally opposed longitudinal edges and also with auxiliary cutting edges 7 and 8 in its frontal planes 5 and 6. The auxiliary cutting edges 7,8 are formed by the four tilted edges of the frontal planes 5 and 6. The auxiliary cutting edges 7,9 are tilted in such a way that their respective cutting points 9 and 10 lie at the diagonal end points of the parallelepipedic blank. Edges 11 and 12 are rounded off in order to form a point radius.

A recess 14 is provided within the area of the longitudinal edge 13 which connects the auxiliary cutting edges 7 and 8. As can be seen in FIG. 5, recess 14 generally corresponds to a keyway which traverses obliquely the longitudinal edge 13. The side planes of the keyway thereby form the seat planes or surfaces 15 and 16 to which the clamping plane or surface 17 of the clamping jaw 4 abuts clampingly depending on the working position of the cutting bit 3, that is, whether the auxiliary cutting edge 7 or the auxiliary cutting edge 8 is in an active working position. The contact surfaces 15 and 16 rise obliquely inwardly relative to the contact plane 18, in other words in the direction of arrow P1 as well as in the direction of arrow P2 shown in FIG. 2. This arrangement assures that the cutting bit 3 is pulled into the mounting in the direction of the diagonal line which connects both cutting points 9 and 10 when the clamping jaw 4 is clamped, the clamping axis of the jaw 4 being also oblique relative to the contact plane 18 in such a manner that the clamping plane 17 of the claimping jaw 4 is parallel each time to either seating plane 15 or seating plane 16. This practice results in a particularly solid fastening of the cutting bit 3 in the recess 2 of the tool holder 1, so that no jumping out or twisting of the cutting bit 3 need be feared at heavy cutting loads. The recess 19 serves for the protection of the alternatingly unused cutting point which is disposed freely therein.

In order to securely hold the clamping jaw 4, the latter is provided with a bearing leg 20 having an axial, threaded tap 22, the bearing leg 20 fitting into an accepting borehole 21 in the tool holder 1. The threaded tap 22 shows, for example, a right-handed thread while respectively, a borehole 23 is provided with a left-directed thread, the borehole 23 being connected to the accepting borehole 21. When a threaded bolt 24, the ends 25 and 26 of which are also formed with oppositely directed thread segments, is turned, the clamping jaw 4 comes either nearer to the contact plane 18 or moves further away. By placing a hexagonal key into a hexagonal recess 27 at the upper or the lower frontal end of the threaded bolt 24, loosening and fastening of the cutting bit 3 in relation to the tool holder 1 is easily effected.

Figure 6:
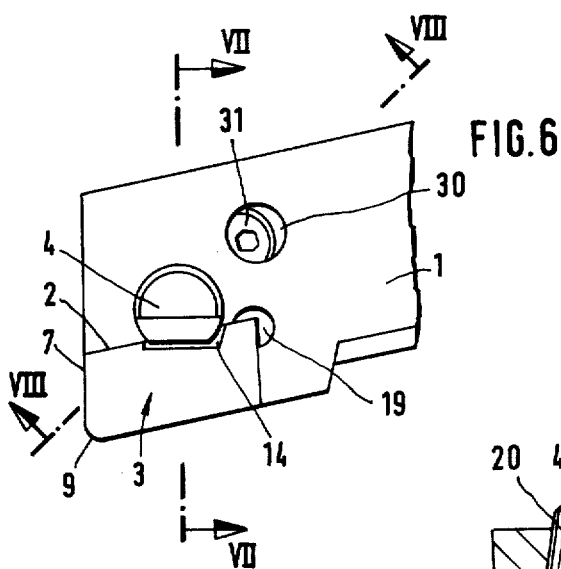
FIG. 6 is a top view of the head of a cutting tool according to an alternative embodiment.
Figure 7:
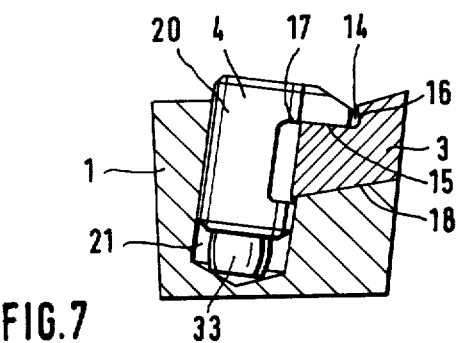
FIG. 7 is a cross sectional view taken along the line VII—VII in FIG. 6.
Figure 8:
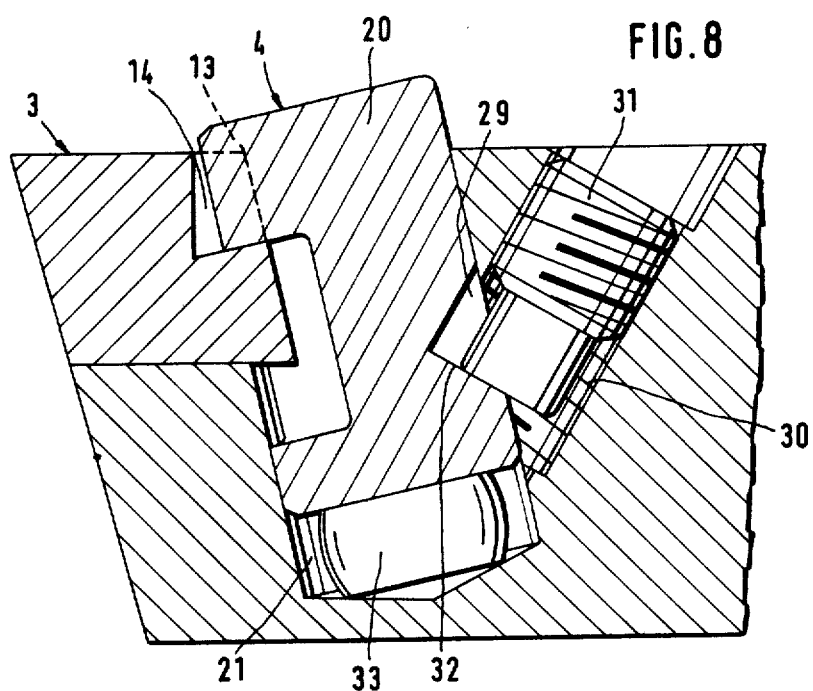
FIG. 8 is a cross sectional view taken along the line VIII—VIII in FIG. 6.

FIGS. 6 to 8 show another embodiment of a cutting tool which is, as far as the clamping of the clamping jaw is concerned, identical to the tool in FIGS. 1 to 5 and uses also the same cutting bit 3. In the embodiment of FIGS. 6 to 8, the clamping jaw 4 which also has a bearing leg extending into an accepting hole 21 in the tool holder 1 is further provided with a notch 29, so that a setscrew 31 may abut against a counter plane or surface 32 formed by the notch 29. A setscrew 31 is capable of screwing into a threaded tap 30 which is oblique relative to the accepting hole 21. This abutting action serves to move and urge the bearing leg 20 of the clamping jaw 4 against the spring-like action of a rubber body 33 into the accepting hole 21 and thereby securely fasten the cutting bit 3. The clamping jaw 4 moves automatically into the inactive position with regard to the cutting bit 3 when the setscrew 31 is loosened and thereby relaxes the rubber body 33.

Figure 9:
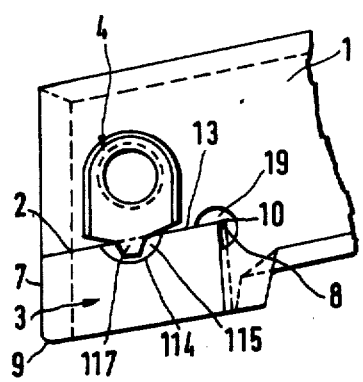
FIG. 9 is a top view of the head of a cutting tool according to a further alternative embodiment.
Figure 11:
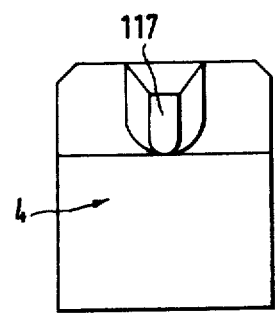
FIG. 11 is an enlarged frontal view of the head of the clamping jaw used in FIG. 9.

As seen in the embodiment in FIGS. 9 to 11, a recess 114 is provided in the vicinity of the longitudinal edge which connects the auxiliary cutting edges 7 and 8. As can best be seen in FIG. 10, the recess 114 is constructed as a conical recess. The inner surface of the recess 114 forms a seating surface 115 for both possible clamping positions of the cutting bit 3 within the mounting, onto which seating surface 115, the clamping finger 117 of the clamping jaw 4 abuts. Independently, whether the auxiliary cutting edge 7 or the auxiliary cutting edge 8 is in a working position or not, the clamping finger 117 which abuts clampingly against the seating surface 115 secures the cutting bit 3 in the recess of the tool holder 1 in a direction of the diagonal line which connects the cutting points 9 and 10. This practice results in a particularly secure and solid fastening of the cutting bit 3 in the recess 2 of the tool holder 1, so that no jumping out or twisting of the cutting bit 3 need be feared at heavy cutting loads. The recess 19 (FIG. 8) serves for the protection of the alternatingly unused point which rests freely therein.

The clamping jaw 4 in the embodiment of FIGS. 9 to 11 is secured in the same manner as in the embodiment of FIGS. 1 to 5 wherein the bearing leg 20 of the clamping jaw 4 is provided with an axially threaded tap 22, the bearing leg 20 fitting into an accepting borehole 21 on the tool holder 1. The threaded tap 22 has, for example, a right hand thread while a borehole 23 is respectively provided with a left hand thread, the threaded tap 22 being a continuation of the accepting borehole 21. On turning of the threaded bolt 24, the ends 25 and 26 of which are also formed with oppositely directed threaded segments, the clamping jaw 4 either moves toward the contact plane 18 or moves further away. Loosening and fastening of the cutting bit 3 in relation to the tool holder 1 is easily effected by placing a hexagonal key into the hexagonal recess 27 at the upper or lower frontal end of the threaded bolt 24.

A further embodiment of the cutting bit and of the clamping jaw which is a part thereof is shown in FIGS. 12 to 14 and differs from the embodiment in FIGS. 9 to 11 only by providing two recesses 114' instead of one recess 114. The respective clamping jaw also has two clamping fingers 117'. The two recesses 114' are arranged at a distance from each other along a line which is oblique relative to the edge 13.

FIG. 15 shows simultaneously various possible cross sectional shapes of a cutting bit according to the present invention. The unbroken lines show the preferred rhombic shape which was used in the previous Figures and the cross section thereof is symmetrical to a diagonal plane E which contains the principal cutting edges S1 and S2. In other words, the cross section consists of two identical isosceles triangles D1 and D2. This cannot be said about the other alternative possible cross sectional shapes which were previously defined in this application as kite-shaped and wherein the cross section of the cutting bit consists of two unequal isosceles triangles, namely the triangle D1 and either the triangle D3 or the triangle D4. The numeral 13 denotes each time the longitudinal edge which contains the recess 14 or 114, in which case it is, in contradistinction to the rhombic (and also the special square) cross section, with the unsymmetrical kite-shaped cross sections, not possible to arrange the recess 14 or 114 also within the longitudinal edge which lies opposite to the longitudinal edge 13. This elective or even double possibility of arranging the recess 14 or 114 is restricted to cutting bits having rhombic or square cross sections.

The present invention is not restricted to the above illustrated embodiments. It would also be possible to arrange the recesses 114 or 114' within the edge 113 of the cutting bit 3 which is disposed opposite to the edge 13. This possibility of arrangement in the bottom edge of the free plane of the cutting bit is of course also valid for the provision of a keyway as shown in FIG. 5. In that case the clamping jaw would be arranged underneath the cutting bit in the mounting shaft or holder, similar to the cutting tool shown in German Design Patent 1 733 568.

Further more it would also be possible to arrange simultaneously the recesses 14, 114, or 114' as well in the edge 13 in the oppositely disposed edge 113 of the cutting bit 3. In that case, as mentioned before, one and the same recess would be used on every cutting bit even when it is rechucked, in other words when the cutting edges are changed. The simultaneous provision of the second recess though would make it possible to machine from one and the same blank right cutting as well as left cutting cutting bits.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A cutting tool comprising a tool holder having a recess, said recess having a bottom surface, a cutting bit in said recess, a clamping jaw securing said cutting bit to said tool holder, said cutting bit having four longitudinal sides joining one another to form longitudinal edges with oppositely disposed longitudinal edges defining the main cutting edges of the tool bit, said cutting bit having frontal faces at the longitudinal ends thereof, said frontal faces terminating in edges defining auxiliary cutting edges, each of said longitudinal main cutting edges intersecting a transverse auxiliary cutting edge to provide cutting means at diagonally opposite longitudinal ends of said cutting bit, each of said cutting means and associated cutting edges being operable to selectively effect a cutting action depending on the orientation of the mounting of the cutting bit on said tool holder, said cutting bit having means thereon defining a recess extending from at least one of said longitudinal edges, said recess having seating surfaces against which said clamping jaw is clamped, one of said seating surfaces being inclined upwardly and rearwardly relative to said bottom surface and relative to one of said frontal faces when the latter has its auxiliary cutting edge exposed, the other of said seating surfaces being inclined upwardly and rearwardly relative to said bottom surface and relative to the other of said frontal faces when the latter has its auxiliary cutting edge exposed, whereby said cutting bit may be mounted in two different positions on said tool holder utilizing the same recess for accommodating the clamping jaw.

2. A cutting tool according to claim 1 wherein each of said seating surfaces is transversely inclined downwardly and inwardly relative to the corresponding longitudinal sides.

3. A cutting tool according to claim 1 wherein said cutting bit has a rhombic cross sectional configuration.

4. A cutting tool according to claim 1 wherein said cutting bit has a square cross sectional configuration.

5. A cutting tool according to claim 1 wherein said cutting bit has a cross sectional configuration defined by two isosceles triangles joined at a common base.

6. A cutting tool according to claim 1 wherein said recess extends from the longitudinal edge which connects said auxiliary cutting edges.

7. A cutting tool according to claim 1 wherein said clamping jaw has a clamping surface abutting said seating surfaces of said cutting bit such that the clamping action applies a rearwardly directed force component to said cutting bit and in the direction of the diagonal which connects said cutting means.

8. A cutting tool according to claim 1 wherein said recess is in the form of a keyway which extends obliquely relative to one longitudinal edge of said cutting bit.

9. A cutting tool according to claim 1 wherein said recess terminates short of both of said frontal planes.

10. A cutting tool according to claim 1 wherein said frontal planes are disposed at an acute angle relative to a transverse plane perpendicular to the longitudinal axis of said cutting bit whereby each three edges comprised of a main cutting edge, an auxiliary cutting edge, and one edge of a frontal plane define a cutting point enclosed in an acute angle.

11. A cutting tool according to claim 1 wherein the longitudinal edge from which said recess extends encloses a right angle with a diagonal line extending from the longitudinal ends of the last said longitudinal edge.

12. A cutting tool according to claim 1 further comprising a threaded bore in said tool holder in which a setscrew is threaded for tightening said clamping jaw, said clamping jaw having a bearing leg against which said setscrew bears, said bearing leg being accommodated within an accepting borehole in said tool holder, said setscrew having its longitudinal axis tilted relative to the longitudinal axis of said accepting borehole.

13. A cutting tool according to claim 12 wherein a resilient means is disposed in said accepting borehole between the bottom of said accepting borehole and the longitudinal end of said bearing leg.

14. A cutting tool according to claim 13 wherein said resilient means is made of rubber.

15. A cutting tool according to claim 1 wherein said clamping jaw has a bearing leg having an internal thread, a threaded bolt threadedly engaging said internal thread, said threaded bolt having a threaded segment at an opposite end thereof wherein the direction of the thread in said segment is different from the direction of the thread which engages said internal thread in said bearing leg, said tool holder having a threaded bore in which said threaded segment of said threaded bolt is threadedly received, said threaded bolt being actuated by the application of a tool to thereby secure or release said cutting bit from said tool holder.

16. A cutting tool according to claim 15 wherein said threaded bolt has a hexagonal recess in at least one of its ends.

17. A cutting tool comprising a tool holder having a recess, said recess having a bottom surface, a cutting bit in said recess, a clamping jaw securing said cutting bit to said tool holder, said cutting bit having four longitudinal sides joining one another to form longitudinal edges with oppositely disposed longitudinal edges defining the main cutting edges of the tool bit, said cutting bit having frontal faces at the longitudinal ends thereof, said frontal faces terminating in edges defining auxiliary cutting edges, each of said longitudinal main cutting edges intersecting a transverse auxiliary cutting edge to provide cutting means at diagonally opposite longitudinal ends of said cutting bit, each of said cutting means and associated cutting edges being operable to selectively effect a cutting action depending on the orientation of the mounting of the cutting bit on said tool holder, said cutting bit having means thereon defining a recess extending from at least one of said longitudinal edges, said recess having at least a partial arcuate surface, said clamping jaw having a corresponding arcuate surface which is accommodated in and which bears against said arcuate surface in said recess, said recess being constructed and arranged such that the cutting bit may be selectively changed to expose either frontal surface while said clamping jaw effects a clamping action in said recess, whereby said cutting bit may be mounted in two different positions on said tool holder utilizing the same recess for accommodating the clamping jaw.

18. A cutting tool according to claim 17 wherein said recess has at least partially a conical configuration.

19. A cutting tool according to claim 17 wherein said recess has at least partially a frustro-conical configuration.

20. A cutting tool according to claim 17 wherein two spaced recesses are provided in said cutting bit, said clamping jaw having two spaced arms each accommodated in said two recesses, said recesses being positioned along a line disposed obliquely relative to a longitudinal edge of said cutting bit.

* * * * *